United States Patent [19]

Shor et al.

[11] 3,925,574

[45] Dec. 9, 1975

[54] PROCESS FOR COATING SUBSTRATES WITH α-SUBSTITUTED β-PROPIOLACTONE GRAFT COPOLYMERS

[75] Inventors: Arthur Charles Shor; John William Van Dyk, both of Wilmington, Del.

[73] Assignee: E. I. Du Pont de Nemours & Company, Wilmington, Del.

[22] Filed: Mar. 7, 1973

[21] Appl. No.: 338,688

[52] U.S. Cl. .............. 427/195; 260/886; 260/887; 260/897 R; 427/375
[51] Int. Cl. ..................... B44d 1/094; B44d 1/09
[58] Field of Search...117/21, 132 B, 132 C, 161 UC, 117/161 UT, 161 UZ; 260/897 R, 886, 887

[56] References Cited
FOREIGN PATENTS OR APPLICATIONS
786,747  1/1973  Belgium OTHER PUBLICATIONS
Shiota et al. *Journal of Applied Polymer Science* Vol. 13 pp. 2447–2458 (1969).

*Primary Examiner*—Michael Sofocleous

[57] ABSTRACT

Process for coating substrates with α-substituted β-propiolactone graft copolymers, where the base or backbone polymer is an amorphous organic polymer and contains at least one site capable of being converted into an anion, in the form of plastisols, organosols or powders are provided.

9 Claims, No Drawings ns with 3,925,574

PROCESS FOR COATING SUBSTRATES WITH α-SUBSTITUTED β-PROPIOLACTONE GRAFT COPOLYMERS

BACKGROUND OF THE INVENTION

1. Field of Invention

This invention relates to processes for coating substrates.

2. Prior Art

Random graft copolymers in which homopolymers of α-substituted-β-propiolactones, such as pivalolactone, are grafted to an amorphous base are described in U.S. patent application Ser. No. 268,056, filed June 30, 1972, in the name of Sherman A. Sundet and assigned to the assignee of the present application (also see Belgium Pat. No. 786,747, granted Jan. 26, 1973). These graft copolymers are moldable and extrudable and are useful in preparing films, fibers and other molded or extruded articles. However, there are many uses for polymers where they cannot be extruded or molded, e.g., as coating compositions useful as paints and adhesives.

SUMMARY OF THE INVENTION

According to the present invention there is provided a process for coating a substrate comprising:

1. applying to at least one surface of the substrate a layer of a polymer composition in the form of a plastisol, organosol or powder, said polymer comprising a copolymer formed by contacting an amorphous base polymer of at least 2000 molecular weight having at least one random anionic site thereon selected from the group consisting of carbanion, carboxylic anion and alkoxide anion with up to 150% by weight of the polymer of at least one α-substituted-β-propiolactone, polymerizing the β-lactone to form crystallizable polymer sidechains having a length of between 3 and 1000 monomer units and a weight up to 60% by weight of the graft composition, and 2. heating the layer to a temperature sufficient to fuse the polymer into a continuous coating.

DETAILED DESCRIPTION OF THE INVENTION

The present invention is directed to the application of a coating of a random graft copolymer, in which a homopolymer of an α-substituted-β-propiolactone is grafted to an amorphous base, to a substrate such as a metal sheet. Such a copolymer is applied in the form of an organosol, plastisol or powder.

The propiolactone graft copolymers described in the aforesaid Belgium Pat. No. 786,747 can be used in the process of the present invention and the disclosure is hereby incorporated by reference. Briefly, the polymer as used in the present process comprises a copolymer formed by contacting an amorphous base copolymer of at least 2000 molecular weight having at least one random anionic site thereon selected from the group consisting of carbanion, carboxylic anion and alkoxide anion (preferably carboxylic anion), with up to 150% by weight of the polymer of at least one α-substituted-β-propiolactone (preferably pivalolactone), polymerizing the β-lactone to form crystallizable polymer sidechains having a length of between 3 and 1000 monomer units, preferably between 5 and 50 and most preferably between 5 and 30 monomer units, and a weight up to 60% by weight of the graft composition, preferably about 10 to 40% by weight.

It is preferred that the coating compositions used in the present process be based on amorphous base polymers that are acrylic or styrene copolymers containing about 1 to 10% by weight of acrylic acid or methacrylic acid. Preferably, the remainder of the copolymer can be styrene or at least one alkyl ester (1 to 8 carbon atoms) of acrylic acid or methacrylic acid. Methyl methacrylate is the preferred ester and it can be used either alone with the acid or copolymerized with another alkyl ester such as ethyl acrylate.

The graft copolymer can be applied to the substrate as a powder. Usually, the powder particles are smaller than 700 microns in size; but, normally will be in the range of 10 to 150 microns. Substrates are coated using conventional powder coating techniques such as fluidized bed, electrostatic fluidized bed, electrostatic spray gun, block spray gun and flame spray. The powder particles are fused into a coating during or after application by the application of heat, i.e., the substrate can be hot when the coating is applied or the combination of the powder coating and substrate is heated after the coating is applied. These powder coatings have improved leveling characteristics via reduced melt viscosities. In addition, the graft copolymers offer a superior film hardness/ melt viscosity balance when compared to selected random amorphous copolymers. A useful powder for powder coating can also be obtained when a small amount of plasticizer is used. Normally, 5 to 40% by weight of plasticizer can be used to make a fluffy powder before the powder gets too tacky.

The graft copolymer can also be in the form of a plastisol when it is employed to coat a substrate. Any plasticizer known in the art can be used. Such plasticizers include triethylene glycol di(2-ethyl butyrate), dioctyl phthalate, diethyl phthalate, butyl benzyl phthalate, didecyl phthalate, dicyclohexyl phthalate, 2-ethylhexyl phthalate, coconut, glycol phthalate alkyd, low molecular weight polyesters (polymeric types), e.g. adipic polyester, phthalic polyester, cellulose acetate butyrate (CAB), tricresyl phosphate, dibutyl phthalate and dihexafluoroacetone adduct of diphenyl ether (DPE-HFA). Care should be taken that the crystallinity of the graft copolymer is not altered when the plastisol is prepared.

The plastisol is applied as a paste-like material containing a mixture of plasticizer (10 to 90% by weight) and copolymer powder (10 to 90% by weight), preferably about 40:60 to 60:40 and most preferably about a 50:50 mixture. Application can be by knife or roller coating to a given substrate. The coating when heated, forms useful coherent coated articles. Uniqueness is found in the superior capability of the graft copolymers to resist low temperature solvation in plasticizer. The graft copolymer is more stable at fixed particle size, molecular weight and plasticizer concentration than its amorphous backbone which may be attributed to the crystalline domains in the polymer.

An organosol composition can also be used to coat a substrate. In an organosol, at least one non-polymerizable volatile liquid solvent or diluent is used as a carrier for the graft copolymer. Examples of suitable liquids are hydrocarbon solvents such as toluene, xylene, benzene, kerosene, hexane, heptane, VM & P naphtha, petroleum naptha and mineral spirits; esters such as butyl benzyl phthalate, didecyl phthalate, diethyl phthalate, cellosolve acetate, butyl cellosolve acetate, ethylene glycol diacetate and propylene carbonate; ketones such as methylethyl ketone, methyl isobutyl ketone, methyl butyl ketone and acetone. The solvent is usually present in the range of about 50 to 75% by weight and any person skilled in the art will know what solvent to use with any particular graft copolymer.

Any of the coating compositions used in the process of the present invention can contain any of the optional additives known in the coating art such as pigments, fillers, extenders, dyes, stabilizers of various types and flow control agents. The particular type coating composition used can depend on the properties of the final coating and the type of substrate used. For example, powder coatings are usually used with metallic substrates and a coating having a high level of pigment or filler may be best applied as an organosol.

The invention can be further understood by referring to the following examples in which parts and percentages are by weight unless otherwise indicated.

EXAMPLE 1

A pivalolactone grafted acrylic copolymer powder for coating applications was prepared as follows:

A. Preparation of an acid functional acrylic copolymer backbone of about 97% methyl methacrylate (MMA) and 3% methacrylic acid (MAA) having a molecular weight of about 90,000 (GPC):

PROCEDURE a. Initial Charge:

| | |
|---|---|
| 481.9 g. | MMA |
| 7.8 g. | MAA |
| 332.0 g. | Benzene (reagent grade) |
| 0.96 g. | Azobis-isobutyronitrile catalyst |

Ingredients were charged to a 2-liter resin kettle equipped with air powered anchor stirrer, $N_2$ inlet, condenser, 2-liter heating mantle, dropping funnel, and thermometer. Ingredients were brought to reflux (90°C.) at which time 0.96 g. azobis-isobutyronitrile dissolved in 10 g. benzene was charged to initiate reaction. Temperature was maintained at reflux.

b. Feed Solution No. 1:

| | |
|---|---|
| 2.52 q. | MAA |
| 0.12 g. | Azobis-isobutyronitrile |
| 6.20 g. | Benzene |

These ingredients were charged dropwise (at about .3 cc/min.) for a time period of about 23 minutes starting at about 2 minutes into polymerization and ending at about 25 minutes.

c. Feed Solution No. 2:

| | |
|---|---|
| 3.48 g. | MAA |
| 0.98 g. | Azobis-isobutyronitrile |
| 46.0 g. | Benzene |

These ingredients were charged dropwise at about 0.6 cc/min.) for a time period of about 98 minutes; from about 25 minutes to about 120 minutes.

d. Feed Solution No. 3:

| | |
|---|---|
| 0.78 g. | MAA |
| 0.02 g. | Azobis-isobutyronitrile |
| 0.86 g. | Benzene |

These ingredients were added by capillary pipette (about 2 drops every 4 minutes) for a time period of about 60 minutes; about 120 minutes to about 180 minutes.

e. At 140 minutes, the batch was thinned to about 50% solids with addition of 113 g. benzene.

f. At 180 minutes, the batch was thinned to about 40% solids with addition of 254 g. benzene and cooled.

g. At 220 minutes, the batch was thinned to about 30% solids with addition of 417 g. benzene.

B. Graft Polymerization of pivalolactone (PVL) to copolymer A:

Initial Neutralization (20 mole percent COOH):

300 g. of the acrylic copolymer solution in benzene (30% solids) as prepared in A. and 7 g. of tetra-n-butyl ammonium hydroxide (TBAH) solution (25% in methanol) were charged to a 1-liter resin kettle equipped with air powered anchor stirrer, condenser, thermometer, dropping funnel, and $N_2$ inlet. The ingredients were heated, stirred rapidly, and brought to reflux. Refluxing was continued for 10 minutes to neutralize.

PVL Polymerization:

At reflux, 30 g. PVL monomer was added dropwise to the batch over a period of 25 minutes. The batch was refluxed for an additional hour and cooled.

Graft copolymer formation became evident by change is solubility. Material became gelled and insoluble in benzene at room temperature. Other indications exist in melt flow behavior.

CALCULATIONS 300 g. polymer solution at 30% solids →
90 g. backbone polymer.

a. Calculate for weight fraction MAA: 90 g. backbone polymer × 3% (conc. MAA) → 2.7 g. MAA $$\text{Moles } MAA = \frac{2.7 \text{ g. MAA}}{86 \text{ MW } MAA} = 0.032$$

b. 20 mole percent neutralization of MAA
 0.032 mole MAA × 0.2 = 0.0064 mole MAA to neutralize
 260 (MW TBAH) × 0.0064 = 1.66 g. (TBAH needed to neutralize 20 mole percent MAA) or about 7 g. TBAH solution at 25% in MeOH c. Calculate D.P. (D.P. = number of PVL monomer units in PPVL molecule)

$$\text{Mol. wt. } PPVL = \frac{\text{g. } PVL}{\text{moles } MAA} = \frac{30}{0.032} = 940$$

$$D.P. = \frac{\text{Mol. wt. } PPVL \text{ Molecule}}{\text{Mol. wt. } PVL \text{ monomer}} = \frac{940}{100} = 9.4$$

$$\% PVL = \frac{30}{120} \times 100 = 25\%$$

C. Batch Work-Up

Graft polymer as prepared in B. is isolated from gelled solution by vacuum drying at low temperatures for several days (60°C. × 3 days × 25–30 inches Hg). Drying temperatures below the melting points of the crystalline domains are maintained to prevent structural changes. After drying, the polymer is ground to a fine powder using a "micro-mill," screened to 250 microns in size to remove large particles and agglomerates, then redried in a vacuum oven overnight (see conditions above), and tested.

D. Powder Coating

The 250 micron size powders prepared in C. were electrostatically sprayed onto Bonderite 40 unprimed steel panels to give a film thickness of 3 mils, baked at about 180°C. for 30 minutes. The powder had good melt flow and formed a coalesced, coherent film having light orange-peel. A 20° gloss of 9 was measured on a glossmeter (Lockwood and McLorie Inc. Model AJ3 Horsham, Pa.).

The acrylic copolymer backbone prepared in A. was put in powder form according to the procedure in C. and powder coatings were prepared as in the preceding paragraph. The powder was barely fused and loose particles were noted in the surface. A 20° gloss of 0 was obtained.

EXAMPLE 2

A plastisol was prepared from the graft copolymer powder prepared in Example 1C by mixing with a spatula 5 g. of graft copolymer powder and 5 g. of triethylene glycol di(2-ethyl butyrate) plasticizer (Flexol 3 GH). A paste-like material was formed which remained as a stable, workable and flowable material for at least 120 hours at room temperature.

A plastisol prepared as above from the acrylic copolymer backbone completely gelled and fused to a polymeric plug in less than 72 hours at room temperature.

EXAMPLE 3

Following the procedure of Example 1B, 334 g. of a 30% solids solution (80/20 toluene/acetone mixture) of a copolymer of 98% methyl methacrylate and 2% methacrylic acid and 4 g. of TBAH solution were charged to a 1-liter resin kettle. The ingredients were stirred and heated rapidly with reflux beginning at 79°C. After refluxing for 10 minutes, 20 g. of PVL was added dropwise to the batch over a period of 25 minutes, the batch refluxed another hour and then cooled.

The graft copolymer was about 83% acrylic backbone and 17% PPVL and had a D.P. PPVL of 10.

The graft copolymer, having a Tg of 74°C. as determined by a differential scanning colorimeter, was solution mixed with 0–30% of Flexol 3GH and then dried from solution. Films prepared from the mixture had a hardness (Tukon Hardness Test) from 21 knoops at 0% plasticizer to 7.5 knoops at 30% plasticizer. The hardness indicates that the plasticized powders could be applied as a powder coating.

For a comparison, a random copolymer of 75% methyl methacrylate and 25% butyl methacrylate having a Tg of 88°C. was solution mixed with 0–30% Flexol 3GH and film hardness tested. The copolymer is an acrylic typically used in powder coating. Hardness ranged from 15 knoops at 0% plasticizer to 5 knoops at 30% plasticizer.

EXAMPLE 4

Following the procedure of Example 1B, 380 g. of a 30% solids solution in benzene of a copolymer of 94% methyl methacrylate and 6% methacrylic acid and 16 g. of TBAH solution were charged to a 1-liter resin kettle, and then stirred and heated rapidly. After 10 minutes at reflux, 114 g. of PVL was added dropwise over a period of 25 minutes. The batch was then refluxed until gellation occurred (about 10 minutes) and then cooled.

The graft copolymer was about 50% acrylic backbone and 50% PPVL and had a D.P. PPVL of 14.3.

Plastisols were prepared by (a) mixing 15 grams of graft copolymer and 15 grams of Flexol 3GH and (b) 18 grams of graft copolymer and 12 grams of Flexol 3GH. After 30 days at room temperature, neither plastisol underwent any noticeable viscosity change as measured on a Brookfield RVT Viscosimeter (No. 6 spindle).

A sample of plastisol (a) was placed in an oven at 40°C. and evaluated qualitatively at given time intervals. After 4 days, was becoming stiff but still workable.

Plastisol (a) was doctored onto an aluminum panel to give a coating 4 mils in thickness and then baked in an oven at 160°C. for 30 minutes. A clear, high gloss, completely coalesced film was obtained which was qualitatively judged to be excellent although tending to be somewhat brittle.

EXAMPLE 5

Following the procedure of Example 1B, 380 g. of a 25% solids solution in benzene of a copolymer of 56% methyl methacrylate and 43.5% ethyl acrylate and 0.5% methacrylic acid and 10 g. of TBAH solution were charged to a 1-liter resin kettle and then stirred and heated rapidly. After 10 minutes at reflux, 14 g. of PVL was added dropwise over a period of 15 minutes. The batch was refluxed for an additional hour and then cooled.

The graft copolymer was about 87% acrylic backbone and 13% PPVL, had a D.P. PPVL of 28 and a melt viscosity at 180°C. of about $10^6$ poises. The backbone had a melt viscosity at 180°C. of about $4 \times 10^4$ poises. When put in powder form according to the procedure of Example 1C and the powder applied to steel panels as a powder coating as in Example 1D, the powder had good melt flow and formed a coherent film.

EXAMPLE 6

Following the procedure of Example 1B, 300 g. of a 32% solids solution in toluene of a copolymer of 98% styrene and 2% methacrylic acid, and 4 g. of TBAH solution were charged to a 1-liter resin kettle. 40 grams of PVL was added as in previous examples.

The graft copolymer was about 71% sytrene backbone and 29% PPVL and had a D.P. PPVL of 20.

A plastisol was prepared from the graft copolymer as in Example 2 and plastisol was a usable paste for at least 24 hours at room temperature whereas a plastisol prepared from the styrene backbone solvated to gel in less than 15 minutes.

What is claimed is:

1. A process for coating a substrate comprising:
    1. applying to at least one surface of the substrate a layer of a polymer composition, in the form of a plastisol, organosol or powder, consisting essentially of
        a. 10–95% by weight, based on the weight of the polymer composition, of a polymer, said polymer comprising a copolymer formed by contacting an amorphous base polymer of at least 2000 molecular weight having at least one random anionic site thereon selected from the group consisting of carbanion, carboxylic anion and alkoxide anion with up to 150% by weight of the polymer of at least one α-substituted-β-propiolactone, polymerizing the β-lactone to form crystallizable polymer sidechains having a length of between 3 and 1000 monomer units and a weight up to 60% by weight of the graft composition, and b. 5–90% by weight, based on the weight of the polymer composition, of plasticizer, solvent or a mixture thereof; and 2. heating the layer to a temperature not exceeding 200°C, in the absence of pressure, to fuse the polymer into a coherent coating.

2. The process of claim 1 wherein the sidechains consist essentially of pivalolactone homopolymer and have a length of between 5 and 50 monomer units and a weight between 10 and 40% of the graft composition.

3. The process of claim 2 wherein the base polymer has carboxylic group anionic sites.

4. The process of claim 2 wherein said polymer composition comprises a plastisol containing a nonpolymerizable plasticizer.

5. The process of claim 4 wherein the plasticizer is selected from the group consisting of triethylene glycol di(2-ethyl butyrate), dioctyl phthalate, diethyl phthalate, butyl benzyl phthalate, didecyl phthalate, dicyclohexyl phthalate, 2-ethylhexyl phthalate, coconut, glycol phthalate alkyd, low molecular weight polyesters (polymeric types), e.g. adipic polyester, phthalic polyester, cellulose acetate butyrate (CAB), tricresyl phosphate, dibutyl phthalate and dihexafluoroacetone adduct or diphenyl ether (DPE-HFA).

6. The process of claim 2 wherein said polymer composition is a powder having a particle size less than about 700 microns.

7. The process of claim 6 wherein the substrate is metallic.

8. The process of claim 7 wherein the polymer composition additionally contains pigment.

9. The process of claim 1 wherein the polymer composition additionally contains pigment.

* * * * *